Patented Oct. 10, 1944

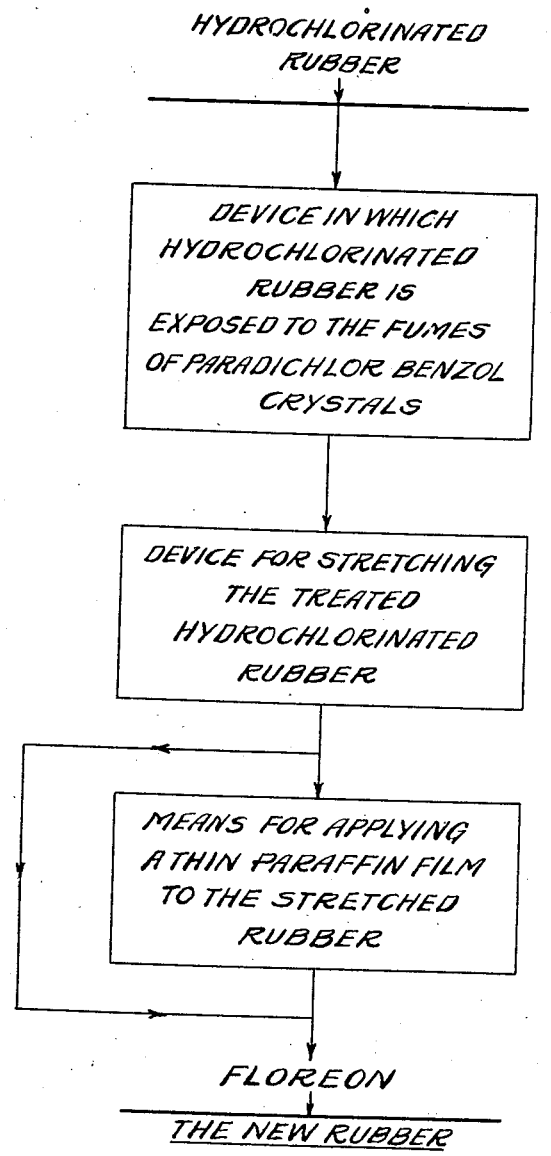

2,359,956

UNITED STATES PATENT OFFICE 2,359,956

METHOD OF TREATING RUBBER HYDROCHLORIDE FILM

Le Moine Wright, Wilmington, Del.

Application June 26, 1941, Serial No. 399,935

5 Claims. (Cl. 117—7)

My invention relates to a novel rubber product and to a novel method, or process of manufacturing the product.

Numerous experiments have been made by me to produce a rubber product from hydrochlorinated rubber which can be used in the manufacture of string, ribbon, decorative products such as artificial flowers, and other articles which can be made from a rubber product, and, the primary object of my invention is to use hydrochlorinated rubber as the base of my novel rubber product.

Another object of my invention is to produce a novel rubber product from hydrochlorinated rubber that will not, when in the presence of air and light, have any serious deteriorating effect on the product, as is the effect on hydrochlorinated rubber.

Another object of the invention is to produce a novel rubber product from hydrochlorinated rubber, either in sheet or strip form, which will be economical in the cost of manufacture, and, which can be stored indefinitely without taking special precautions, as is required in the storage and shipment of hydrochlorinated rubber.

Another object of the invention is to provide a novel rubber product from stretched, or expanded hydrochlorinated rubber that will not restore itself to, or regain its original condition, but will remain in its stretched condition, thus a strip of hydrochlorinated rubber of given dimensions can be greatly increased in size, particularly in length, whereas a strip of hydrochlorinated rubber, per se, cannot be stretched to increase its size, either width or length.

A further object of the invention is to produce a novel rubber product from hydrochlorinated rubber, that will have the usual qualities of hydrochlorinated rubber, such as lightness, tensile strength, etc., but will have the added advantages of greater lightness, equally as great in tensile strength, more easily handled in the manufacture of products therefrom than is possible with hydrochlorinated rubber, per se.

The added advantages gained in my new rubber product over just hydrochlorinated rubber are obtained by introducing, or exposing hydrochlorinated rubber, in any practical fashion or manner, to the fumes, or gases of paradichlorbenzol crystals, or their chemical equivalent, whether in crystal, or liquid form, under ordinary room temperature, or slightly greater, if desired, for a given period of time, then stretching the gassed or fume impregnated hydrochlorinated rubber, whether in sheet, or strip form, to form a cellular structure of the fume impregnated hydrochlorinated rubber, and then sealing the fumes contained in the individual cells by exposing the fumed, or gas laden cellular structure to fumes rising from heated paraffin, or bringing structure into sliding, or drawn contact with a paraffin paste resulting from the cooling of heated, or hot paraffin.

In general, the method, or process of manufacturing my new and novel rubber material comprises exposing, for activation, hydrochlorinated rubber by emanating fumes or gases from paradichlor-benzol crystals, at ordinary room temperature for a predetermined period of time as by storing hydrochlorinated rubber in a room, or a container containing the crystals, or by moving the hydrochlorinated rubber being activated by such emanation in a substantially continuous movement for a period of five, ten or fifteen minutes, which I have discovered by experiments to have changed the characteristics of hydrochlorinated rubber that was at least two years old and brittle; and then stretching the gas impregnated hydrochlorinated rubber, in strip form, for manufacture into string, ribbon, or similar articles of manufacture, and then sealing the manufactured articles by fumes from heated paraffin, or passing the articles, such as string, ribbon, or the like, through a paraffin paste.

As is well known, ordinary rubber becomes brittle if attacked, or oxidized by air and deteriorates easily, and this is more so when it comes to hydrochlorinated rubber when exposed to air and light, and, to prevent this, I expose hydrochlorinated rubber to the fumes, or gases of paradichlor-benzol for a predetermined length of time to provide a fume or gas filled cellular structure, stretch the product thus formed, and then seal the cellular structure with fumes from heated paraffin, or pass such product through a paraffin paste, either before or after it has been manufactured into commercial articles for sale such, for instance, as string, ribbon, artificial flowers and various other articles too numerous to mention, and which articles, it has been found, will not easily deteriorate, as if made from hydrochlorinated rubber, per se, and, further, the stretched material forming my novel product will not return to, or regain its former condition as before hydrochlorinated rubber has been processed, as hereinbefore described.

By satisfying all of the conditions, as hereinbefore described, I have been successful in producing a novel rubber product from hydrochlorinated rubber, of substantially uniform cellular structure and containing gas within the cells which is sealed by paraffin paste, or fumes from heated paraffin, and the resultant product is cheap to make and as light as a feather.

The various stages of treatment of hydrochlorinated rubber above described have resulted in a new rubber product.

I do not wish to limit myself to any particular length of time as to the exposure of the hydrochlorinated rubber to the fumes of paradichlorbenzol as I have obtained good results in just a few minutes, depending upon how close the hydrochlorinated rubber is to the paradichlor-benzol crystals and I have stretched the hydrochlorinated rubber to double its original length, therefore I positively discovered that a para-compound ($C_6H_4Cl_2$) paradichlor-benzol will effect the colloidal state of a hydrochlorinated rubber to allow it to be stretched to form a new rubber product which I term Floreon.

The paraffin need only be applied to the gassed hydrochlorinated rubber, if at all, after stretching has been done, and then only to preserve it where it has been made into string, or other commercial products, therefore it is important to remember that my method is the gas treatment of hydrochlorinated rubber after it is dry to enable stretching of same without the aid of any liquid or intensified heat.

The paradichlor benzol crystals are to be used after the hydrochlorinated rubber has been manufactured, and after it has been made ready for storage or for use.

The many advantages of the herein described method or process of treating hydrochlorinated rubber for the purpose of stretching same to provide a new rubber product will readily suggest themselves to those skilled in the art to which it appertains.

While I have described the preferred method or process of embodying my invention, it will be clear that I may modify the same without departing from the spirit of my invention.

What I claim is:

1. The method of making a novel rubber product which comprises exposing hydrochlorinated rubber, in dry form, to the fumes of paradichlorbenzol for a period of time at ordinary room temperature and then stretching the rubber.

2. The method of changing the character of hydrochlorinated rubber, in dry form, which comprises passing the rubber through fumes generated from paradichlor-benzol crystals to impregnate the hydrochlorinated rubber with the fumes to render the rubber elastic, and then stretching the material to produce a new rubber useful in the manufacture of rubber products.

3. The method of treating hydrochlorinated rubber to form a new rubber product, which comprises gas impregnating the rubber with paradichlor-benzol and then stretching the rubber to new dimensions.

4. The method of lengthening strips of hydrochlorinated rubber which comprises exposing the rubber to the fumes of paradichlor-benzol and then stretching the rubber strips longitudinally.

5. The method of lengthening strips of hydrochlorinated rubber which comprises exposing the rubber to the fumes of paradichlor-benzol, stretching the rubber longitudinally, and then sealing the gas impregnated stretched rubber with a paraffin film.

LE MOINE WRIGHT.